(12) United States Patent
Garvin et al.

(10) Patent No.: US 8,079,843 B1
(45) Date of Patent: Dec. 20, 2011

(54) SELF-STRIPPING FORMING INSERT

(76) Inventors: Joe Garvin, Shepherd, MI (US); John Robison, Weidman, MI (US)

( * ) Notice: Subject to any disclaimer, the term of this patent is extended or adjusted under 35 U.S.C. 154(b) by 1198 days.

(21) Appl. No.: 11/731,665

(22) Filed: Mar. 30, 2007

Related U.S. Application Data

(60) Provisional application No. 60/787,744, filed on Mar. 31, 2006.

(51) Int. Cl.
*B29C 45/40* (2006.01)
(52) U.S. Cl. ............ 425/436 R; 425/388; 425/437; 425/DIG. 60; 425/812
(58) Field of Classification Search .......... 425/436 R, 425/441, 422, 443, 405.1, 388, 437, 556, 425/DIG. 60, 812, 401; 264/334, 572
See application file for complete search history.

(56) References Cited

U.S. PATENT DOCUMENTS

| | | | | |
|---|---|---|---|---|
| 3,324,511 A | * | 6/1967 | Micai et al. ............. | 425/398 |
| 3,943,601 A | * | 3/1976 | Kuhlman ............... | 425/441 |
| 3,989,436 A | * | 11/1976 | McNeely et al. ......... | 425/572 |
| 4,013,391 A | * | 3/1977 | Boden et al. ............ | 425/145 |
| 4,106,887 A | * | 8/1978 | Yasuike et al. .......... | 425/549 |
| 4,459,092 A | * | 7/1984 | Hatakeyama ........... | 425/112 |
| 4,647,274 A | * | 3/1987 | Oda ..................... | 425/135 |
| 4,755,128 A | * | 7/1988 | Alexander et al. ....... | 425/292 |
| 4,832,676 A | * | 5/1989 | Johns et al. ............ | 493/152 |
| 4,865,793 A | * | 9/1989 | Suzuki et al. ........... | 264/278 |
| 4,946,640 A | * | 8/1990 | Nathoo ................. | 264/316 |
| 5,028,377 A | * | 7/1991 | Hendry ................. | 264/572 |
| 5,087,188 A | * | 2/1992 | Staver .................. | 425/116 |
| 5,330,693 A | * | 7/1994 | Takada ................. | 264/106 |
| 5,356,284 A | * | 10/1994 | Sheffield ............... | 425/556 |
| 5,368,468 A | * | 11/1994 | Boskovic ............... | 425/556 |
| 5,484,274 A | * | 1/1996 | Neu ..................... | 425/116 |
| 6,086,800 A | * | 7/2000 | Manlove ............... | 264/37.32 |
| 6,390,800 B1 | * | 5/2002 | Brown et al. ........... | 425/436 R |
| 6,443,421 B1 | * | 9/2002 | Wolfe ................... | 251/62 |
| 6,827,569 B2 | * | 12/2004 | Wieder ................. | 425/130 |
| 6,939,504 B2 | * | 9/2005 | Homann et al. ......... | 264/572 |
| 7,156,650 B2 | * | 1/2007 | Hechtl .................. | 425/556 |
| 7,261,853 B2 | * | 8/2007 | Sutter .................. | 264/318 |
| 7,575,427 B2 | * | 8/2009 | Sato .................... | 425/444 |
| 2002/0175446 A1 | * | 11/2002 | Friery .................. | 264/328.1 |
| 2003/0168780 A1 | * | 9/2003 | Johns et al. ............ | 264/334 |

* cited by examiner

*Primary Examiner* — Yogendra Gupta
*Assistant Examiner* — Emmanuel S Luk
(74) *Attorney, Agent, or Firm* — Robert L. McKellar; McKellar IP Law, PLLC

(57) ABSTRACT

Self-stripping thermoforming insert allows a newly formed article to be removed easily from the forming insert by compressing a region within the insert surface creating a void that allows the newly formed article to separate from the surface of the self-stripping insert. The portion of the insert that compresses is spring loaded and air driven. After the article has cooled the device is activated freeing the newly formed article for simple higher quality components from the thermoforming process.

20 Claims, 3 Drawing Sheets

US 8,079,843 B1

SELF-STRIPPING FORMING INSERT

This application claims priority from U.S. Provisional Patent Application 60/787,744 filed Mar. 31, 2006.

The invention disclosed and claimed herein deals with a forming insert that is self-stripping. A vacuum pulls hot thermoplastic into or over the forming insert, the vacuum terminates allowing the plastic to cool. As the plastic cools a spring mechanism draws the head of the forming insert deeper within the insert separating the head of the forming insert from the bottom surface of the cooled thermoformed plastic allowing the head of the insert to be stripped from the thermoplastic and easily removed from the insert. The forming inserts of this invention are component parts of a Rotary forming wheel application Ser. No. 11/656,166 filed Jan. 22, 2007.

BACKGROUND OF THE INVENTION

The use of mold inserts in the thermoforming manufacture of plastics is not new. Having these inserts movable in relation to their position within a cavity for the purpose of drawing heated thermoformed plastic over the cavity and drawing it within the cavity against the mold insert is also not new.

U.S. Pat. No. 6,939,504 that issued to Homann et al, on Sep. 6, 2005, describes cavity mold inserts that are moveable to allow for plastic materials to fill the entire article defining the mold cavity. The article is formed, cooled then removed from the cavity. The present invention incorporates an internally moving portion of the insert surface that will retract after the article is cooled. This retraction of an area of the cavity surface allows the article to be removed or stripped from the thermoforming cavity insert with greater ease and efficiency, improving the run time of the overall thermoforming process.

A self-stripping forming insert comprising in combination; stationary portion and a movable portion. The stationary portion has a top surface, a bottom surface, an inside surface, an outside surface, a spring mechanism and more than one vacuum passage. The stationary portion has a plurality of openings through it from the top surface to each vacuum passage. The stationary portion houses the movable portion.

The movable portion has a top surface, a bottom surface, an outer edge, a plurality of openings through it. The top surface has male protrusion extending from the top surface. The top surface also has female intrusions depending from the top surface. The top surface may have a combination of male protrusions extending from and female intrusions depending from the top surface. The bottom surface is generally flat. The outer edge of the insert defines the outer circumference of the movable portion of the insert.

The spring mechanism is internal to the stationary portion and is attached to the movable portion through the bottom surface of the movable portion. The spring mechanism is vacuum controlled and mechanically activated moving the movable portion in an up and down motion, relative to the bottom surface, much like an automobile piston.

The opening through the movable portion extends from said top surface of the movable portion through to the bottom surface of the movable portion, said openings allowing a vacuum to be activated upon the top surface of the forming insert drawing molten plastic into and over the forming insert.

DETAILED DESCRIPTION OF THE DRAWINGS

The present invention is a self-striping forming insert. The insert fits into a rotary thermoforming wheel. Heated thermoplastic is drawn over the top of the insert where a vacuum draws the thermoformed plastic into the insert 2, and holds it there until the vacuum is released. After the newly formed thermoplastic has cooled slightly the spring activated portion 34 of the insert compresses, allowing the newly formed thermoplastic article to be easily removed from the insert.

Figure 1:
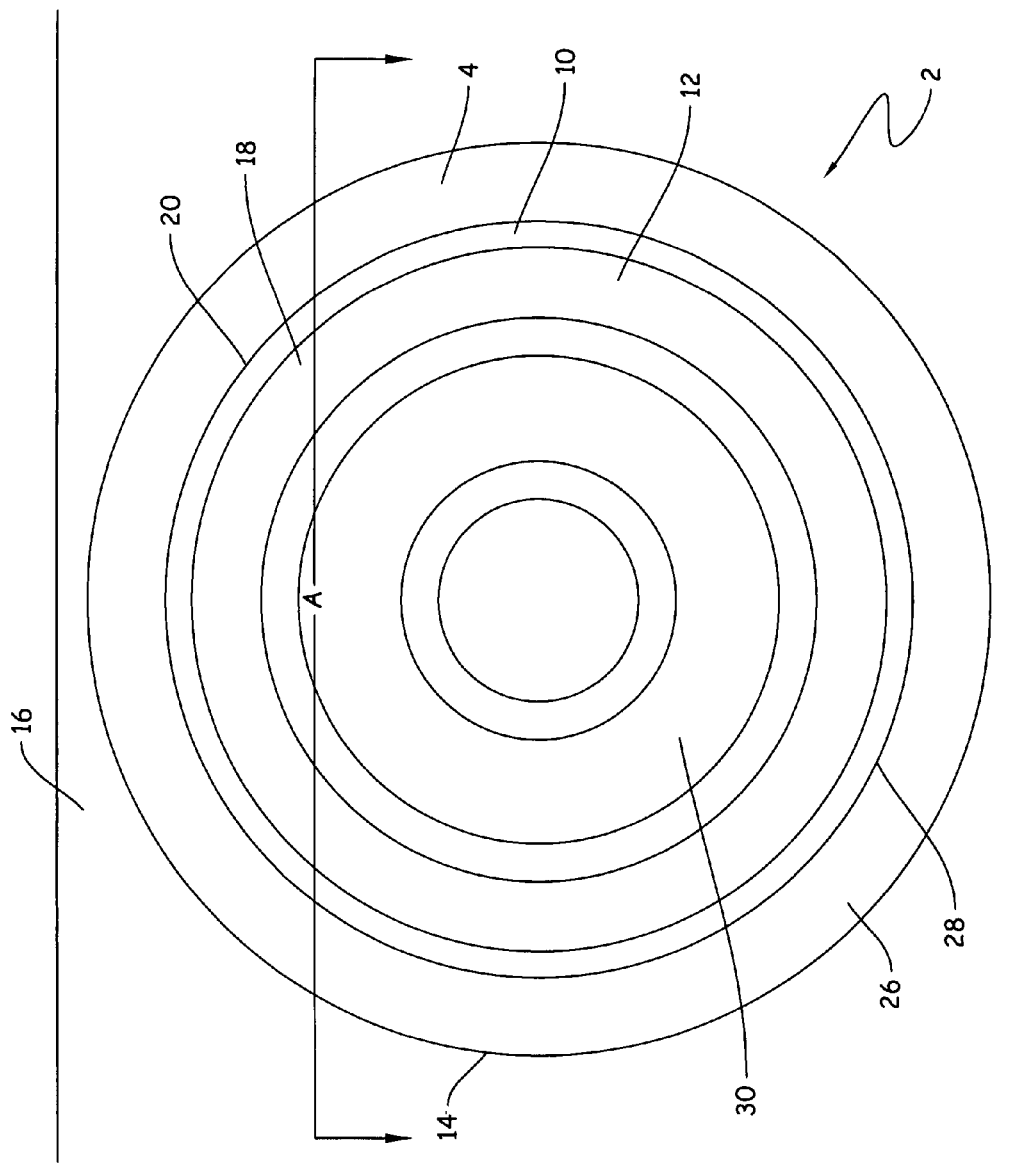
FIG. 1 is a top view of a self-stripping forming insert inside of a forming tray showing line A-A.

FIG. 1 is a top view of a self-stripping forming insert 2 inside of a forming tray 16 through line A-A. From this view the insert tray 16 houses the forming insert 2 and the forming insert 2 houses the movable portion 18. The thermoformed plastic is laid over the tray 16 and insert 2. Then a vacuum draws the thermoformed plastic into and over the top surface 4 of insert 2. The thermoformed plastic is drawn over the male surfaces 10 or protrusions (ridges) and into the female surfaces 12 or intrusion (valleys) of the top surface 4 of insert 2. The insert 2 has a stationary portion 26 and in this embodiment it consists of an outer ring around the movable portion 18. The movable portion 18 is capable of independent movement in relationship to the stationary portion 26. This aspect of the instant invention is the essence of the device in that this movement separates the top surface and the top surface 30 of the movable portion creating a void or opening between the thermoformed plastic and the top surface 30 of the moveable portion 18 allowing the thermoformed plastic to be self-stripping from the insert 2. This movement take place at the inside surface 28 of the stationary portion 30 and the outside surface 20 of the movable portion 18.

Figure 2:
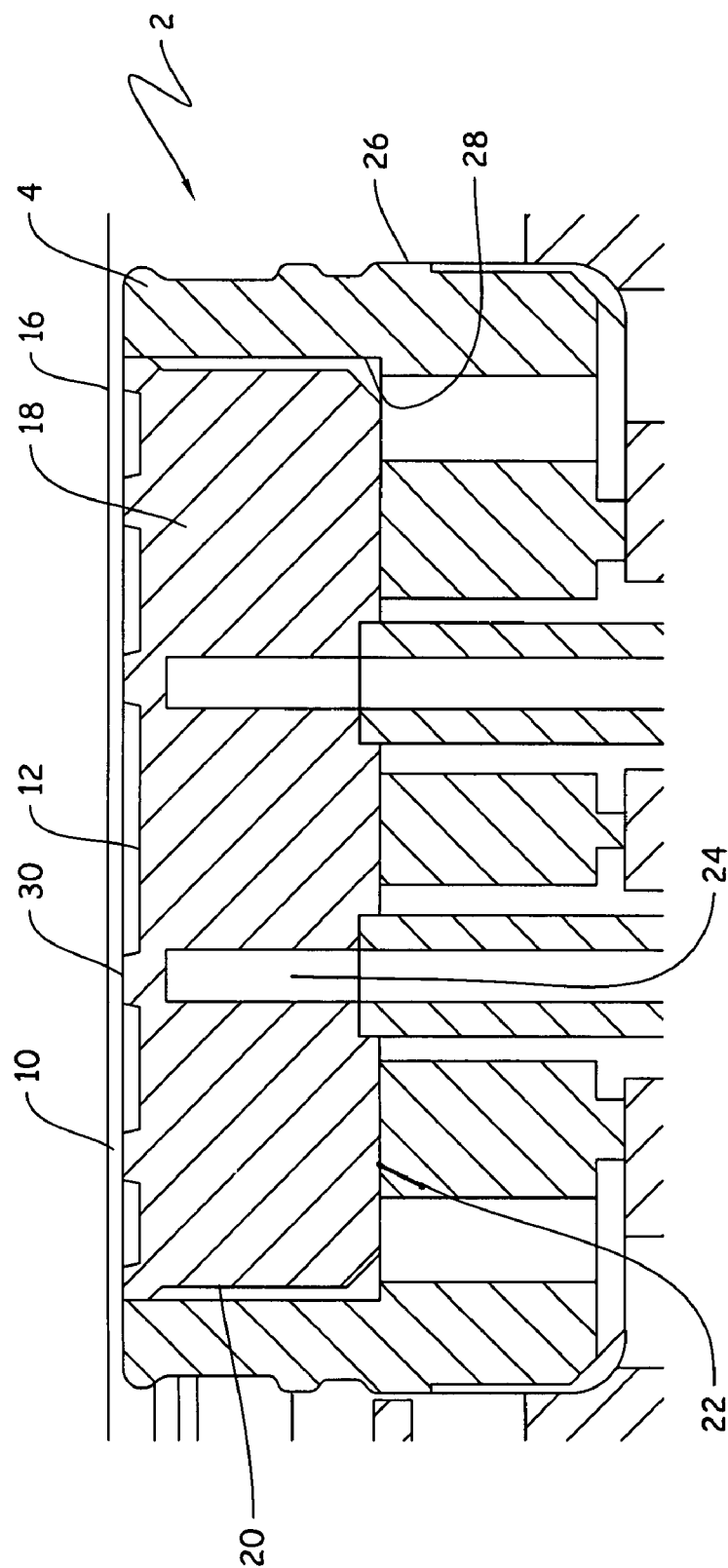
FIG. 2 is a partial sectional view through line A-A of FIG. 1 showing the movable portion housed in a segment of the stationary portion.

FIG. 2 is a partial sectional view along line A-A of FIG. 1 showing the movable portion 18 housed in a segment of the stationary portion 26. This Figure shows the relationship between the movable portion 18 and the stationary portion 26 of the insert 2. The movable portion 18 is housed within the stationary portion 26. The inside surface 28 of the stationary portion 26 facilitates the outside surface 20 and bottom surface 22 of the movable portion 18. The top surface 4 of the stationary portion 26 and the top surface 30 of the movable portion 18 together form the molding surface 32 (observed in FIG. 3) of the insert 2. Both surfaces 4 and 30 have the male surface 10 and the female surface 12 incorporated within this embodiment. Other embodiments include inserts with male surface 10 only and still others have only the female surface 12. The forming tray 16 is also shown and is enlarged for visual effect. The moveable portion 18 is connected to the stationary portion 26 via mounting posts 24.

Figure 3:
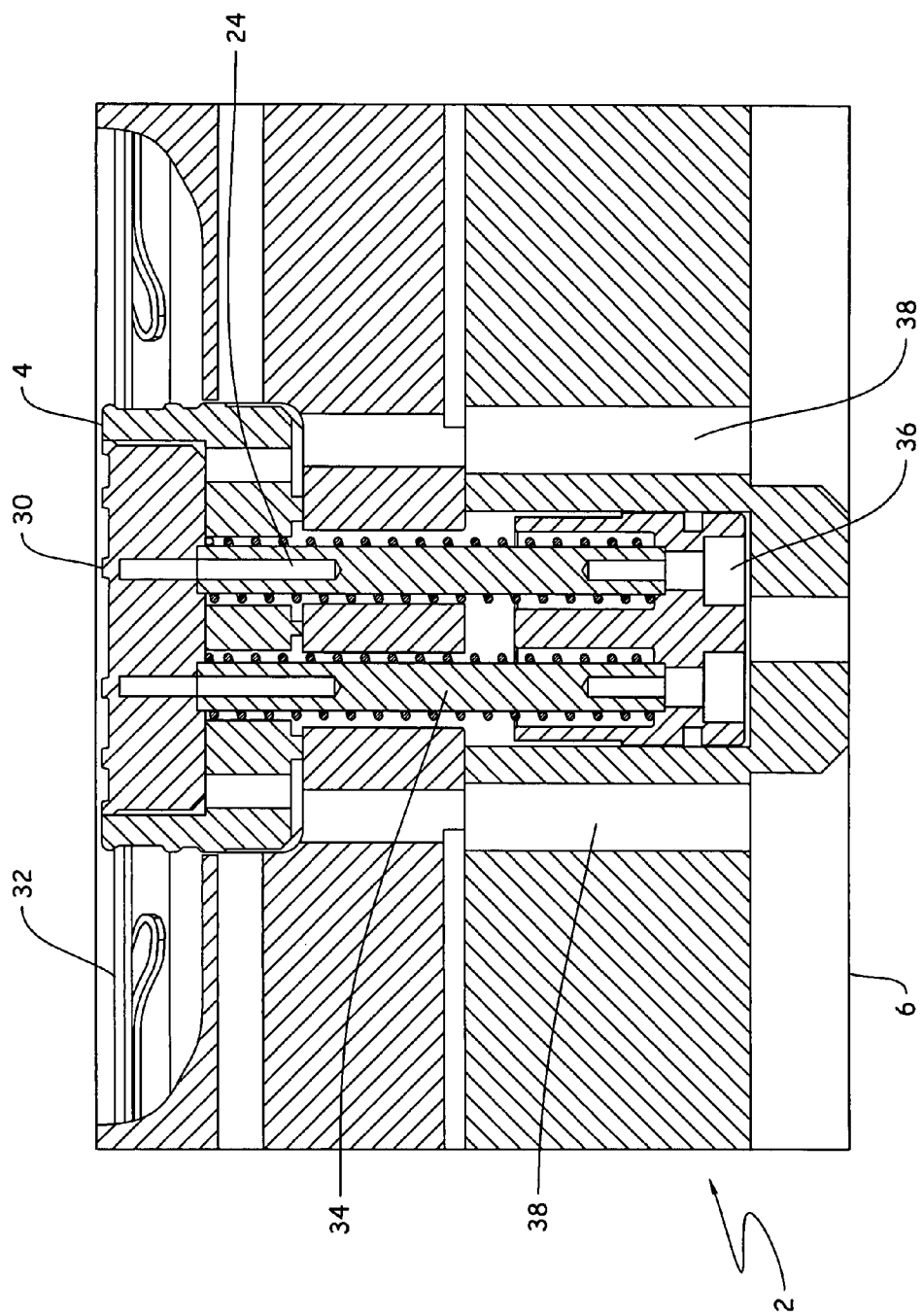
FIG. 3 is an enlarge partial sectional view taken along A-A of FIG. 1 showing the spring mechanism that is internal to the stationary portion of the insert.

FIG. 3 is partial sectional view of along line A-A of FIG. 1 showing the spring mechanism 34 that is internal to the stationary portion 26 of insert 2. These springs 34 are activated when the rotary forming wheel reaches a specific point, and after the thermoformed plastic has began to cool or solidify. The activation of the springs is controlled by the vacuum of the rotary forming wheel through control vacuum passages 36. The compression of the springs 34 draws the movable portion 18 away from the thermoformed product creating a void or opening between the movable portion 18 top surface 30. This void breaks the surface tension created between the molded product and the molding surface 32. This in turn allows the thermoformed product to be self-stripping. This improves the general quality of the product as well as reducing the run time of the product. Both of these factors reduce cost.

Openings therethrough the top surface 4, that is, 32 and 30 are not shown or labeled because their numbers and positions depend solely on the specific lid that is being formed. Because these machines are sold to manufacturers the molding surfaces include a plurality of design factors including company trademarks and logos, and the size, shape and specific design of the manufactured thermoformed products. For this reason the vacuum openings are generic. It should be understood that the thermoformed plastic is brought over the mold surface and the vacuum that reaches the mold surface acts upon the thermoformed plastic bringing it into contact with the mold surface whether that surface is flat, male or female. The different needs of manufacturers defines placement location and their numbers. The size of the vacuum passages is also generic for the same reasons stated for their location.

These inserts are made from materials selected from metals, ceramics, and plastics. Generally they are made of stainless steel.

The inserts are also unique in that they can be of a male nature meaning that they protrude from the surface of the insert and the thermoformed plastic is pulled over the inserts surface to form the product.

The inserts are also capable of being of a female nature where the thermoformed plastic is pulled into the confines of the insert surface forming the product.

The inserts are also capable of being a combination of both male and female where the plastic is both pulled over portions of the insert while at the same time pulled within some confines of the insert, forming a product with essentially ridges and valleys.

The inserts of the instant invention are generally a product used for forming lids and various other thermoformed products such as storage containers of various sizes ranges and shapes. The inserts therefore are of many shapes and sizes depending upon the thermoformed product that they are designed to cover. The thermoformed lid products and inserts are a plurality of shapes and sizes including, but not limited to, oval, circular, rectangular, square and so on.

The movable portion of the insert is controlled via the vacuum of the rotary forming wheel. At the point where the thermoformed plastic has cooled and arrives at a specific point on the wheel a vacuum activates the spring mechanism drawing the movable portion of the insert away from the thermoformed plastic releasing the plastic from the movable portion of the insert allowing for a quick and efficient release from the forming wheel. This is unique to the art, in that, this process provides a higher degree of quality to the thermoformed item.

What is claimed is:

1. A self-stripping forming insert comprising in combination: a stationary portion and a movable portion,
    said stationary portion having a top surface, a bottom surface, an inside surface, a spring mechanism and more than one vacuum passage,
        said stationary portion having a plurality of openings extending therethrough from said top surface of said stationary portion to said bottom surface of said stationary portion,
        said stationary portion housing said movable portion,
    said movable portion having a top surface, a bottom surface, an outer edge, and a plurality of openings therethrough,
        said top surface of said movable portion having male protrusions extending from said top surface of said movable portion,
        said top surface of said movable portion having female intrusions depending therefrom,
        said bottom surface of said movable portion being generally flat,
        said outer edge defining the outer circumference of said movable portion, said outer edge being movably engageable with the inner surface of the stationary portion,
    said plurality of openings allowing a vacuum to be activated upon the top surface of the movable portion of the forming insert drawing molten plastic into and over the top surfaces of both the movable portion and the stationary portion of the forming insert to form a plastic component,
    said spring mechanism being internal to the stationary portion and being attached to the movable portion through the bottom surface of the movable portion, said spring mechanism being vacuum controlled and mechanically activated for moving the movable portion in an up and down motion relative to the bottom surface of the stationary portion, said spring mechanism being capable of being selectively activated to move relative to said stationary component to strip said movable portion from said plastic component.

2. A self-stripping forming insert as claimed in claim 1 wherein the insert is manufactured from a material selected from a group consisting of metals, ceramics and plastics.

3. A self-stripping forming insert as claimed in claim 1 wherein the insert is made of stainless steel.

4. A self-stripping forming insert as claimed in claim 1 wherein the insert has male protrusions extending from said top surface of the stationary portion.

5. A self-stripping forming insert as claimed in claim 1 wherein the insert has female intrusions depending from said top surface of the stationary portion.

6. A self-stripping forming insert as claimed in claim 1 wherein said insert has both male protrusions and female intrusions depending from said top surface of the stationary portion.

7. A self-stripping forming insert as claimed in claim 1 wherein the shape of the insert is oval.

8. A self-stripping forming insert as claimed in claim 1 wherein the shape of the insert is circular.

9. A self-stripping forming insert as claimed in claim 1 wherein the shape of the insert is rectangular.

10. A self-stripping forming insert as claimed in claim 1 wherein the shape of the insert is square.

11. A self-stripping forming insert as claimed in claim 1 wherein the movable portion is vacuum controlled to move relative to the stationary portion.

12. A self-stripping forming insert as claimed in claim 1 wherein the movable portion is mechanically controlled to move relative to the stationary portion.

13. A self-stripping forming insert as claimed in claim 1 wherein said stationary portion comprises at least one indentation in the lower the surface of said movable portion and further wherein said stationary portion comprises at least one mounting post engageable with said at least one indentation.

14. A self-stripping forming insert comprising:
    a stationary portion having a top surface, and an inside surface,
    a movable portion having a top surface, and an outer edge, said outer edge defining the outer circumference of said movable portion, said outer edge being movably engageable with the inner surface of the stationary portion, said movable portion being movable relative to said stationary portion to move the top surface of the movable portion into and out of general alignment with the top surface of the stationary portion, a plurality of openings through said insert adapted to draw a vacuum above the top surfaces of the movable portion and the stationary portion, to draw molten plastic into and over the top surfaces of both the movable portion and the stationary portion of the forming insert to form a plastic component, and a drive mechanism extending between the movable portion and the stationary portion for selectively moving the movable portion in an up and down motion relative to the top surface of the stationary portion, said drive mechanism being capable of being selectively activated to move said movable portion relative to said stationary component to displace said top surface of said movable portion relative to said top surface of said stationary portion to strip said movable portion from said plastic component.

15. A self-stripping forming insert as claimed in claim 14 wherein said plurality of openings extend through said stationary portion and open into said top surface of said stationary portion.

16. A self-stripping forming insert as claimed in claim 14 wherein said plurality of openings extend through said movable portion and open into said top surface of said movable portion.

17. A self-stripping forming insert as claimed in claim 14 wherein said drive mechanism comprises a spring biasing said movable portion in a first direction and a vacuum compartment selectively activatable to bias said movable portion in a direction opposite the first direction.

18. A self-stripping forming insert as claimed in claim 14 wherein at least one of said top surfaces comprises at least one contour selected from a male protrusion and a female intrusion.

19. A self-stripping forming insert as claimed in claim 14 wherein said stationary portion further comprises a chamber accepting said movable portion, said inner surface comprising an inner wall of said chamber.

20. A self-stripping forming insert as claimed in claim 19 wherein said movable portion has a lower wall having at least one indentation and further wherein said stationary portion comprises at least one post extending into said chamber and into engagement with said indentation in said movable portion.

* * * * *